Figure 1:
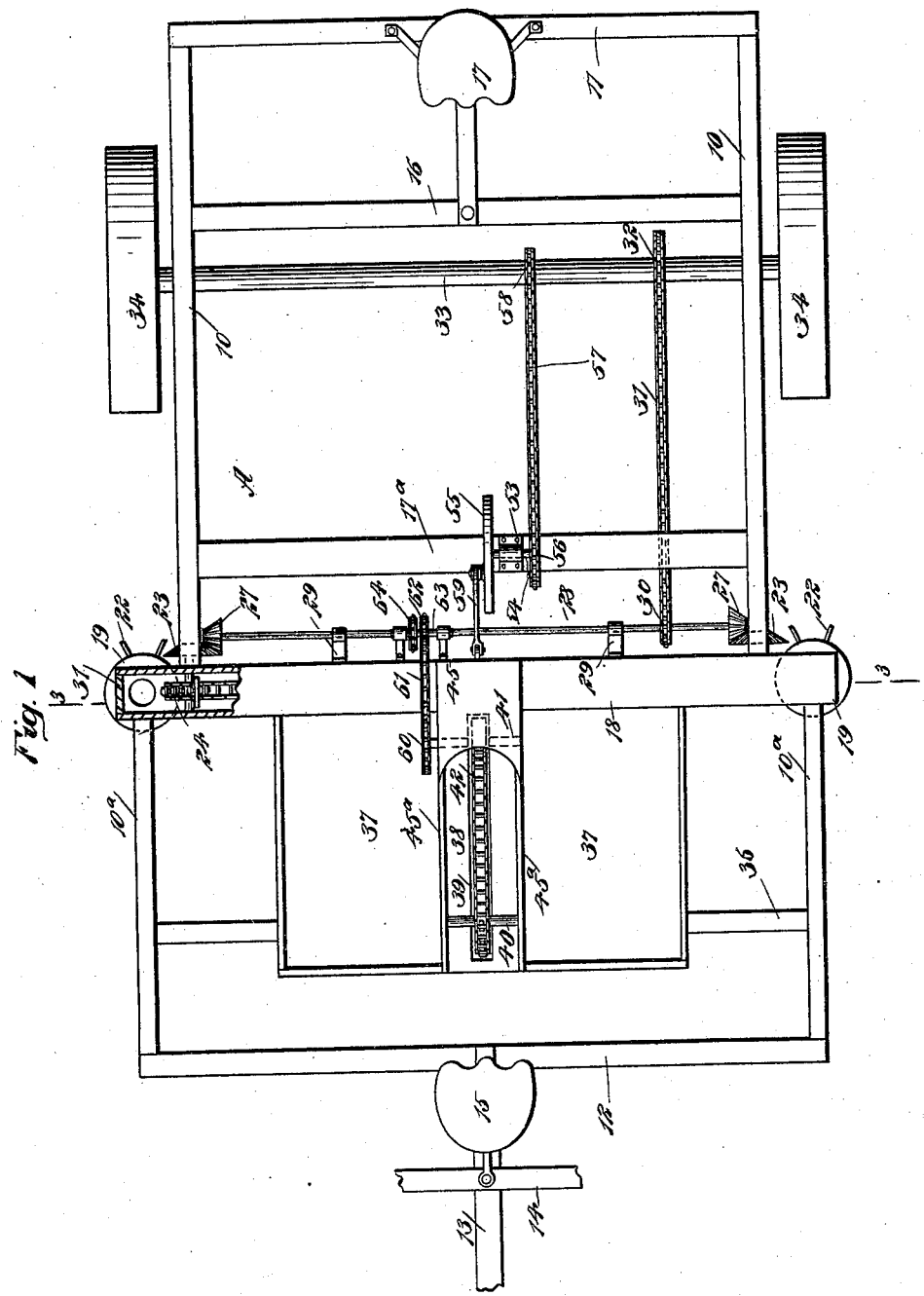

No. 617,639. Patented Jan. 10, 1899.
C. C. & L. S. CAVES.
PLANTER.
(Application filed Oct. 8, 1898.)

(No Model.) 3 Sheets—Sheet 1.

WITNESSES:

INVENTORS

BY

ATTORNEYS.

No. 617,639. Patented Jan. 10, 1899.
C. C. & L. S. CAVES.
PLANTER.
(Application filed Oct. 8, 1898.)
(No Model.) 3 Sheets—Sheet 2.
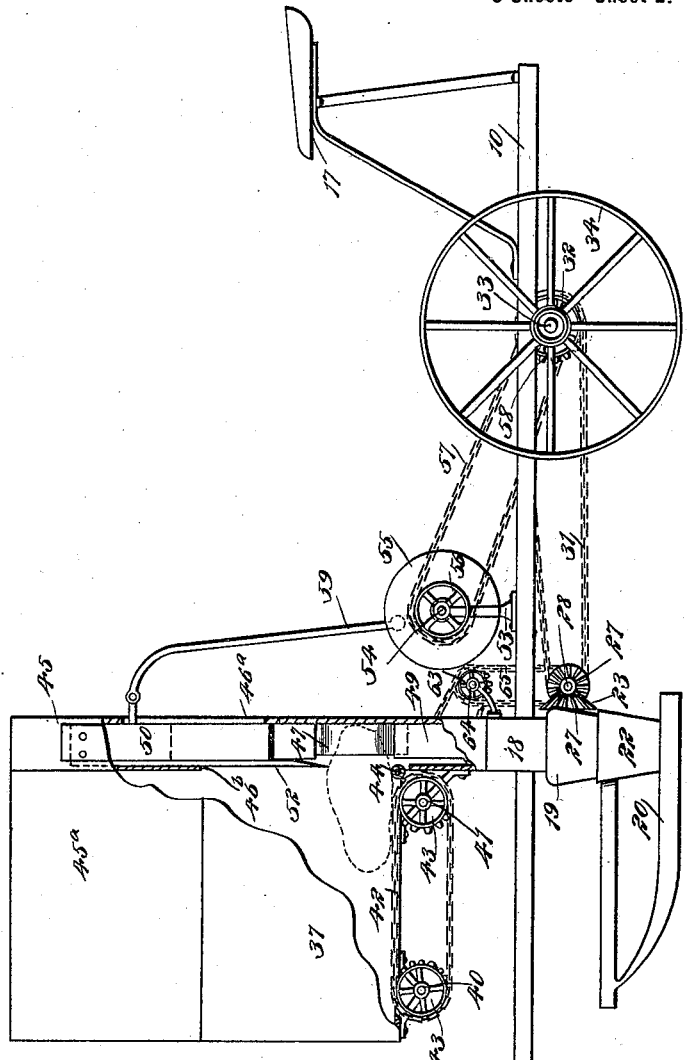
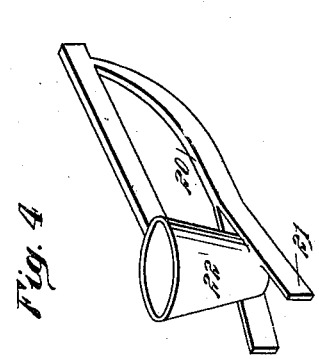
WITNESSES:
J. A. Brophy
J. Fred Acker
INVENTORS
Chiever C. Caves.
Lemuel S. Caves.
BY
ATTORNEYS.

No. 617,639. Patented Jan. 10, 1899.
C. C. & L. S. CAVES.
PLANTER.
(Application filed Oct. 8, 1898.)
(No Model.) 3 Sheets—Sheet 3.
Fig. 3
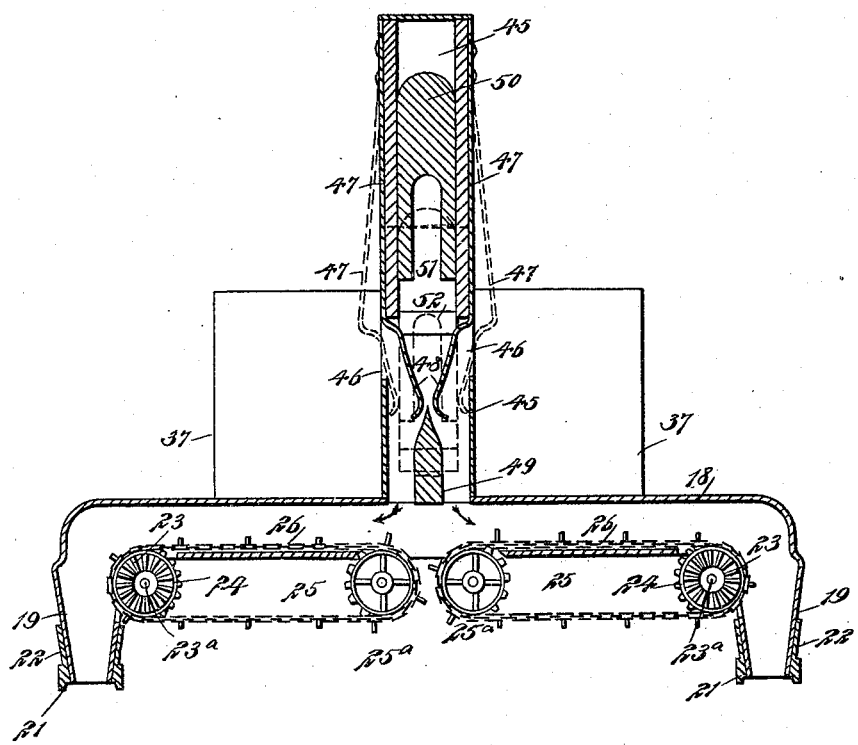
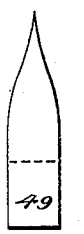
Fig. 5
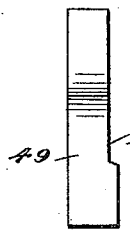
Fig. 6
WITNESSES:
INVENTORS
BY
ATTORNEYS.

UNITED STATES PATENT OFFICE.

CHIEVER C. CAVES AND LEMUEL SHERMAN CAVES, OF FREMONT, IOWA.

PLANTER.

SPECIFICATION forming part of Letters Patent No. 617,639, dated January 10, 1899.

Application filed October 8, 1898. Serial No. 693,010. (No model.)

*To all whom it may concern:*

Be it known that we, CHIEVER C. CAVES and LEMUEL SHERMAN CAVES, of Fremont, in the county of Mahaska and State of Iowa, have invented a new and useful Improvement in Planters, of which the following is a full, clear, and exact description.

The object of our invention is to provide a planter especially adapted for planting potatoes, the said planter being so constructed that the potatoes may be introduced whole into the planter and automatically cut in proper pieces for planting and the cut portions of the seed be automatically delivered to the ground.

A further object of the invention is to so construct a planter of the above description that two rows may be simultaneously planted and to provide for a construction of planter that will be economic, durable, effective, and simple.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 1 is a plan view of the improved planter. Fig. 2 is a side elevation of the planter, parts thereof being broken away. Fig. 3 is a transverse vertical section taken substantially on the line 3 3 of Fig. 1. Fig. 4 is a perspective view of a combined shoe and runner adapted for use in connection with the machine, and Figs. 5 and 6 are side and front elevations of a stationary knife or dividing-partition used in connection with the machine and adapted to divide the slices of potatoes that have been cut from the body of the potatoes by a movable knife.

A represents the frame of the machine, the rear portion whereof consists of side beams 10 and the forward portions of side beams 10$^a$, which extend beyond the vertical plane of the outer faces of the aforesaid beams 10, the rear side beams 10 being connected at the rear of the frame by a cross-bar 11 and the front side beams 10$^a$ being connected at their forward ends by a cross-bar 12. A tongue or pole 13 is secured to the front portion of the frame at its center, the said tongue being provided with a suitable whiffletree or doubletree 14, and a seat 15 is supported at the forward end of the frame, facing rearward. An intermediate cross-bar 16 connects the rear side beams 10, and this bar serves to support a second seat 17, which is the driver's seat and faces forwardly, while a third cross-bar 17$^a$ is utilized to connect and strengthen the forward portions of the rear side beams 10, as is best shown in Fig. 1.

A box-casing 18 is transversely located where the forward and rear portions of the frame connect. This box-casing, which is best shown in Fig. 3, extends beyond the sides of the frame and is provided at each end with a downwardly-extending member 19. Each of the said members 19 of the box-casing 18 is preferably provided with a runner 20, each runner terminating at its rear end in forked members 21, between which members the lower end of a conductor 22 is located, the upper portion of the conductor being attached to the upper portion of the runner, and the said conductors 22 are adapted to fit snugly around the extension members 19 of the box-casing 18, as is shown in Fig. 3; but we desire it to be understood that the combined conductors and runners may be substituted by cutters if so desired.

At the junction of each extension member 19 with the box-casing 18, at the bottom portion of said box-casing, a beveled gear 23 is mounted upon the rear end of a shaft 23$^a$, suitably journaled, and each shaft 23$^a$ is provided within the box-casing with a sprocket-wheel 24, suitable openings being made in the bottom of the box-casing or trough 18 to permit the sprocket-wheels to extend within the same, as is also shown in Fig. 3, and at each side of the center of said trough or box-casing 18 the bottom portion thereof is cut away to receive sprocket-wheels 25, mounted upon suitable shafts 25$^a$, and conveyer-chains 26 are passed around each pair of sprocket-wheels 24 and 25, as is also shown in Fig. 3. These conveyer-chains are adapted to receive the seed-potatoes and convey them to the extensions 19 of the trough or box-casing 18, so that they may be dropped into the ground.

The beveled gears 23 on the conveyer-shafts 23$^a$ are adapted to engage with beveled gears 27, secured at the ends of a driven shaft 28, journaled in suitable bearings 29, attached to the rear of the box-casing or trough 18, as illustrated in Fig. 1. This shaft 28 is driven through the medium of a sprocket-wheel 30, secured to the shaft, usually near its left-hand end, a chain belt 31 being passed over the sprocket-wheel and over a second sprocket-wheel 32, secured to the axle 33, which axle is provided with suitable supporting-wheels 34, as shown in Figs. 1 and 2. The runners 20 serve to support the forward portion of the frame. Consequently wheels may be dispensed with at the front, as illustrated in Figs. 1 and 2.

A cross-bar 36 is made to connect the front side beams 10ª, and at each side of the central portion of the forward section of the frame a bin 37 is made to rest on the cross-bar 36, the rear portions of the bins being attached, preferably, to the forward portion of the trough or box-casing 18, and the said bins may be provided with backs of any desired height, usually the backs of the bins being of equal height with the sides and front.

Between the two bins 37 a platform 38 is located, and in the said platform, as shown in Fig. 1, a longitudinal opening 39 is made, while at the front portion of the said opening a shaft 40 is suitably journaled, and at the rear portion a second shaft 41 is mounted to revolve. A conveyer-belt 42 is made to pass over sprocket-wheels 43, located on the shafts 40 and 41, as shown in Fig. 2, and at the rear upper portion of the conveyer 42 a roller 44 is mounted, as is also shown in Fig. 2, the roller 44 being independent of the said conveyer-belt 42.

At the central portion of the box-casing or trough 18 a vertical box 45 is located, constituting a continuation of the box-casing and being in direct communication therewith, as illustrated in Fig. 3. The vertical box 45 is provided at each of its sides, near its lower end, with opposing openings 46, and at the same sides of the said box 45 the upper ends of springs 47 are secured, the lower ends 48 of which springs are passed within the box 45 through its openings 46, and the lower portions of the springs are made to converge, their lower extremities, however, being curved in opposite directions, as shown in positive lines in Fig. 3. At the back of the box 45 a longitudinal slot 46ª is made, and in the front of the said box a corresponding and longer slot 46ᵇ is produced, as shown in Fig. 2. Partitions 45ª are made to extend upward from the horizontal partition 38 between the bins, and the said vertical partitions are preferably made to engage or connect with the forward portion of the box 45, as shown in Figs. 1 and 2.

A knife or dividing-partition 49 is vertically attached to the central portion of the box 45 at or near the bottom, the said knife or dividing-partition being made to extend upward within the box 45 to a point between the lower ends of the springs 47, as shown in Fig. 3, the upper portion of the cutting-partition 49 or stationary knife being beveled at opposite sides.

Within the upper portion of the box 45 a plunger 50 is mounted to slide, the said plunger being provided with a recess 51 in its bottom capable of receiving a portion of the stationary knife 49. At the front of the plunger 50 a knife 52 is secured, beveled upon its rear face, as shown particularly in Fig. 2. This knife is adapted to cut the potatoes fed to it, the cut portions being further separated by the stationary knife 49, since the cut portions of the potatoes will be forced upon the stationary knife by the plunger 50.

A shaft 54 is journaled in suitable bearings 53, located on the front cross-bar 17ª of the rear portion of the frame, as shown in Figs. 1 and 2. This shaft carries a crank-disk 55 at one end and a sprocket-wheel 56 at the other end, the said sprocket-wheel receiving a chain belt 57, which is carried over a sprocket-wheel 58 on the axle 33, and the crank-disk 55 is connected by a pitman 59 with the plunger 50, the plunger receiving its vertical or reciprocating motion through the said crank-disk, pitman, and other driving connections with the axle.

In the operation of the machine the potatoes are placed in the bins 37 and are taken out singly from said bins by the operator located on the forward seat 15, the potatoes being placed one after the other on the front conveyer 42, and the potatoes are thereupon conducted by the conveyer over the roller 44 and into the box 45. The knife 52 as it advances will slice the potato fed to the box 45, and the plunger, descending with the knife, will force the slice cut from the body of the potato upon the stationary knife 49, causing said slice to be divided, and a portion of the divided slice will be received upon the transverse conveyer 26 at the right of the machine and the other portion upon the transverse conveyer at the left of the machine, the said conveyers conducting the divided slices, which serve as seed, to the outlets 19 of the box-casing 18.

We desire it to be understood that a check-row attachment may be employed in connection with the machine, if desired, and that the front conveyer 42 will move one and one-eighth inches each time the knife 52 and its attached plunger accomplishes one stroke, causing the machine to drill every fifteen inches unless a check-row attachment is employed; but the machine may be geared to drill at any desired intervals.

The conveyer 42, adapted to feed the whole potatoes to the planter, may be driven in any suitable or approved manner. As shown in the drawings, Fig. 1, however, a sprocket-wheel 60 is attached to the shaft 41 of the said conveyer, said wheel 60 being connected by a belt 61 with a wheel 62, located on a short shaft 63, which shaft is journaled in suitable bearings on the box-casing at the rear, and on this short shaft 63 a second sprocket-wheel 64 is located, connected by a chain belt 65 with a suitable sprocket on the driven shaft 28.

We desire it to be understood that the springs 47 at their lower ends 48 hold the potato fed into the box 45 while said potato is being cut by the reciprocating knife 52; but as the plunger 50 descends the springs are separated, as shown in dotted lines in Fig. 3, and the slice of potato is released, permitting the said slice to be divided by the stationary knife 49. We also desire it to be understood that the stationary knife is provided with a recess 49ª in one side, as shown in Fig. 6, to permit the downward passage of the reciprocating knife during the action of the plunger on the sliced portion of the potato.

It will be obvious from the above description, that the machine is susceptible of some modifications without material departure from the principles and spirit of the invention, and for this reason we do not wish to be understood as limiting ourselves to the precise form of the parts herein set forth.

Having thus described our invention, we claim as new and desire to secure by Letters Patent—

1. In a potato-planter, the combination with a frame having wheels at the rear thereof for supporting it, and having runners at the front for supporting the front of the frame and also for opening furrows, of a horizontally-disposed carrier located on the front of the frame and running longitudinally therewith to carry the seed rearward, a vertically-elongated box into which the seed is delivered by the carrier, a stationary knife located in the lower portion of the box, two spring-arms secured respectively to the sides of the box and having their free portions located above the stationary knife, to hold the seed in position to engage the same, a vertically-sliding plunger mounted in the upper portion of the box and capable of moving downward to force the seed upon the stationary knife, a movable knife attached to the plunger and serving to engage the seed as the plunger descends, a box-casing running transversely of the frame below the box, two carriers mounted in the box-casing and respectively carrying the seed to the sides of the machine so as to drop the seed adjacent to the runners thereof, gearing for driving the carriers of the box-casing from the rear wheels of the frame, a shaft also geared with the rear wheels of the machine and caused to revolve thereby, and a link having cranked connection with the said shaft and having connection with the plunger, to impart reciprocal movement thereto.

2. In a potato-planter, the combination with a frame, of a box mounted thereon, means for delivering the seed into the box, a plunger vertically movable in the box and designed to push the seed downward therein, a stationary knife mounted in the lower portion of the box to cut the seed as the plunger moves downward, a movable knife attached to the plunger and serving also to cut the seed as the plunger moves downward, two spring-arms mounted on the box and having their free portions located above the stationary knife so as to hold the seed preparatory to the descent of the plunger, and means for carrying the seed to the runners.

3. In a potato-planter, the combination with a frame having wheels at the rear thereof and having runners at the front thereof, of an endless carrier mounted in the front portion of the frame and running longitudinally thereof to carry the seed rearward, a vertically-elongated box mounted at the rear of said carrier and receiving the seed therefrom at a point intermediate the ends of the box, a stationary knife mounted in the box below the said carrier, a plunger mounted in the box above said carrier and serving to force the seed downward on the stationary knife, a movable knife carried by the plunger and acting as the same descends, spring-arms attached to the box and having their free portions arranged above the stationary knife therein, so as to hold the seed preparatory to the descent of the plunger, and means for carrying the seed transversely to each side of the machine, to drop the same adjacent to the runners.

4. In a potato-planting machine, the combination with a frame, of a vertically-elongated box mounted thereon and adapted to have the potatoes fed thereto at a point intermediate the ends thereof, a stationary knife mounted in the lower portion of the casing, a plunger mounted in the upper portion of the casing and adapted to descend upon the stationary knife, a movable knife carried by the plunger and acting upon the descent thereof, spring-arms attached to the box and serving to hold the seed preparatory to the descent of the plunger, and means for carrying the seed transversely toward each side of the machine, to drop the same.

5. In a potato-planting apparatus, the combination with a frame having wheels at the rear thereof and runners at the front thereof, of a carrier located at the front of the frame and serving to carry the potatoes rearwardly, a vertically-elongated box mounted at the rear end of the carrier and receiving the potatoes therefrom at a point intermediate the ends of the box, a stationary knife mounted at the lower portion of the box, a plunger mounted in the upper portion of the box and serving to move the potatoes downward upon the knife, spring-arms mounted upon the outer portions of the box and projected into the same, the free ends of the arms being located above the stationary knife so as to hold the potato preparatory to the descent of the plunger, a movable knife carried on the plunger and acting upon the descent thereof, a box-casing running transversely of the frame below the box, two carriers mounted in the box-casing and leading respectively toward the runners, and serving to carry the seed toward each side of the frame and drop the same adjacent to the runners, gearing for driving the said carriers from the wheels, a shaft mounted revolubly on the frame, a link having cranked connection with the shaft and connected with the plunger so as to drive the plunger from the shaft, and gearing driving the said shaft from the wheels.

6. In a potato-planting apparatus, the combination with the frame, of a vertically-elongated box, means for feeding the potatoes thereto at a point intermediate the ends of the box, a stationary knife mounted in the lower portion of the box, spring-arms attached to the outside of the box and projected through openings in the walls thereof, the free ends of the arms being located above the stationary knife to temporarily hold the potatoes, a plunger mounted in the upper portion of the box and adapted to descend upon the potatoes, to push the same into engagement with the knife, and means for driving the plunger.

CHIEVER C. CAVES.
LEMUEL SHERMAN CAVES.

Witnesses:
J. B. KROUL,
C. F. DINSMORE.